United States Patent [19]

Pires

[11] 4,115,807
[45] Sep. 19, 1978

[54] TELEPHONE BILLING APPARATUS FOR A SUBSCRIPTION TELEVISION SYSTEM

[76] Inventor: H. George Pires, 20 Surrey La., Parlin, N.J. 08859

[21] Appl. No.: 737,856

[22] Filed: Nov. 1, 1976

Related U.S. Application Data

[63] Continuation-in-part of Ser. No. 706,929, Jul. 19, 1976, Pat. No. 4,068,264.

[51] Int. Cl.² .............................................. H04N 1/44
[52] U.S. Cl. ..................................... 358/122; 358/84; 358/124
[58] Field of Search ..................... 358/84, 86, 122, 124

[56] References Cited

U.S. PATENT DOCUMENTS

| | | | |
|---|---|---|---|
| 3,668,307 | 6/1972 | Face et al. | 358/86 |
| 3,801,732 | 4/1974 | Reeves | 358/124 |
| 3,878,322 | 4/1975 | Sullivan | 358/84 |
| 3,886,302 | 5/1975 | Kosco | 358/86 |
| 3,934,079 | 1/1976 | Barnhart | 358/86 |

Primary Examiner—S. C. Buczinski

[57] ABSTRACT

Each decoder has a random access memory storing program code codes a security number, a customer identification number, and program identification numbers utilized for billing purposes. Communication between each decoder and a central computer is subscriber-initiated. The program code codes must be updated periodically by means of a computer-decoder transmission which takes place only after the program identification numbers have been transmitted from the decoder to the computer. During predetermined cycles in the system sequence, the read-out of the random access memory takes place in reverse order and starting at an arbitrary start point hard-wired into each decoder. Confusion signals are transmitted while program identification numbers already transmitted to the computer are erased in the decoder memory. The communication through the telephone network takes place by frequency shift keying.

14 Claims, 8 Drawing Figures

TELEPHONE BILLING APPARATUS FOR A SUBSCRIPTION TELEVISION SYSTEM

CROSS REFERENCE TO RELATED APPLICATIONS

This application is a continuation-in-part of my application entitled "Subscriber Television System Utilizing Binary Coding", Ser. No. 706,929, filed 07/19/76, now U.S. Pat. No. 4,068,264.

BACKGROUND OF THE INVENTION

The present invention relates to pay television systems, and particularly to those systems wherein the charge to the subscriber depends upon the programs accepted by him. More particularly, it relates to subscriber television systems wherein a program identification number is associated with each program and the charge to the subscriber accepting the program is a function of the program identification number. Previous billing systems which utilized billing cards which were punched upon acceptance of the program by the subscriber have a number of difficulties including the need for a considerable amount of subscriber effort both in inserting the card and mailing it later and the fact that the storage space on the card is limited, therefore either limiting the number of programs for each billing period or having relatively short billing periods. These systems are of course also liable to errors arising from mutiliation of the cards, mailing delays, etc.

SUMMARY OF THE INVENTION

It is an object of the present invention to furnish a billing system which is reliable and requires a relatively small memory capacity, operates with a minimum of subscriber effort but still requires that this effort be made periodically. Further, the system is to have a relatively tight security.

The present invention resides in a pay television system furnishing a television program to subscribers having access to a communications network. The pay television system has encoding-transmitting means for furnishing and transmitting an encoded television signal and further has receiving-decoding means for receiving said encoded television signal and furnishing a corresponding decoded television signal if a program-accept signal is present indicating acceptance of the program by the subscriber. The present invention is a billing system which comprises storage means in each of said receiving-decoding means for storing a plurality of program identification numbers, each indicative of the charge for a subscriber-accepted television program, and a subscriber identification number. It further comprises read-out means coupled to each of said storage means and said communications network for reading out said program identification numbers and said subscriber identification number and furnishing corresponding program identification signals and subscriber identification signals to said communications network. Further, central computing means are connected to said communications network for computing the charge to each of said subscribers in response to said program identification signals under control of said subscriber identification signals. Finally, means are provided for furnishing an initiation signal for initiating the operation of said read-out means.

In a preferred embodiment of the present invention, the storage means have a first and second set of storage locations for, respectively, storing said program identification numbers and said customer identification number. The storage means further have a third set of storage locations for storing program code numbers. The program code numbers are read out from the random access memory under control of the program identification number and determine a decoder mode which must correspond to the encoder code. The program code signals must be updated periodically by the computer. The update takes place only after receipt of the program identification numbers for billing purposes. Subscriber initiation of the billing process is thus enforced periodically.

The addressing means for addressing the random access memory are counting means in a preferred embodiment. The counting means are operative to read out information from the random access memory in a first or a second order, sometimes starting with an arbitrary start number wired into the counter.

Confusion signal generator means are provided both at the central computing means and at the receiving-decoding means, for transmitting confusion signals through the communications network while program identification numbers already transmitted to the central computer are erased in the random access memory.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawings.

DESCRIPTION OF THE PREFERRED EMBODIMENT

Figure 1:
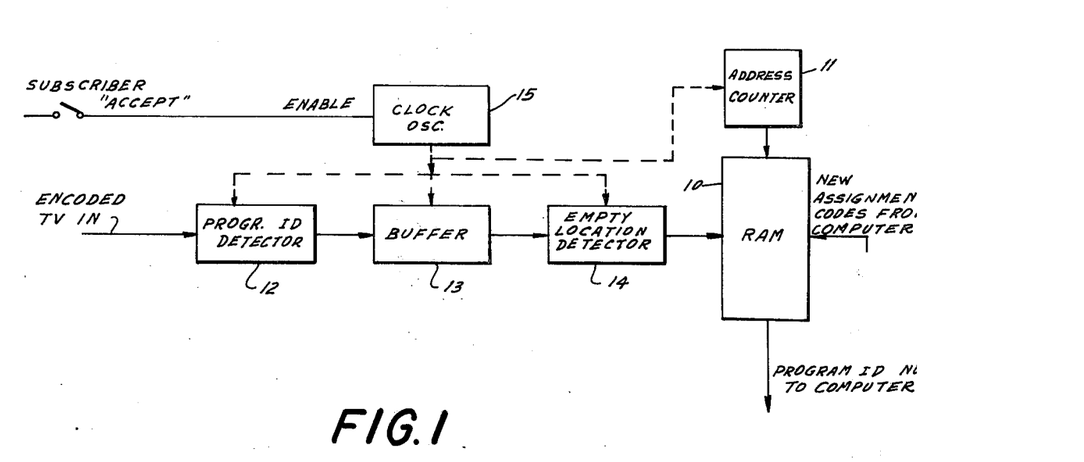
FIG. 1 is a block diagram showing the overall operation of the present invention in conjunction with the prior art subscription television system.

FIG. 1 briefly summarizes the operation of the binary coded subscription television system described in U.S. application Serial No. 706,929 by the same inventor and assigned to the same assignee of which this present application is a continuation-in-part. This application is hereby incorporated by reference. Special attention is drawn to FIG. 6 which illustrates how the program identification numbers transmitted at predetermined times in the cycle of the encoder television signal are, upon receipt of a subscriber acceptance signal, entered into the first available empty location in the random access memory of FIG. 6 which is the same random access memory shown in FIG. 1 of the present application. The random access memory is denoted by reference numeral 10 in FIG. 1 of the present application. It should be noted that the same components have the same reference numerals throughout this application.

For purposes of convenience, the subject matter of U.S. application Ser. No. 706,929, insofar as it relates to the present application, will be reviewed briefly. The program identification number is a hexadecimal number of two digits, each of which is represented by four bits. It is derived from the encoded television signal by a program identification number detector 12 which includes means for detecting numeral "9" which signals the coming of the program identification number and the proper counting and timing circuits to then derive the correct eight bits from the correct horizontal lines of selected vertical frames of the television signal. The so-detected program identification number is stored in a buffer 13. The number of the buffer is compared to program identification numbers previously stored in the random access memory 10 and, if no such number has previously been stored, the empty location detector 14 is utilized to effect the storage of the program identification number in the proper location in the random access memory. The whole process is carried out under synchronization by a clock 15 which is operative only when the subscriber pushes a button or switches a switch, thereby indicating that he accepts the program. The clock 15 also, of course, controls address counter 11, one embodiment of addressing means for random access memory 10.

Figure 2:
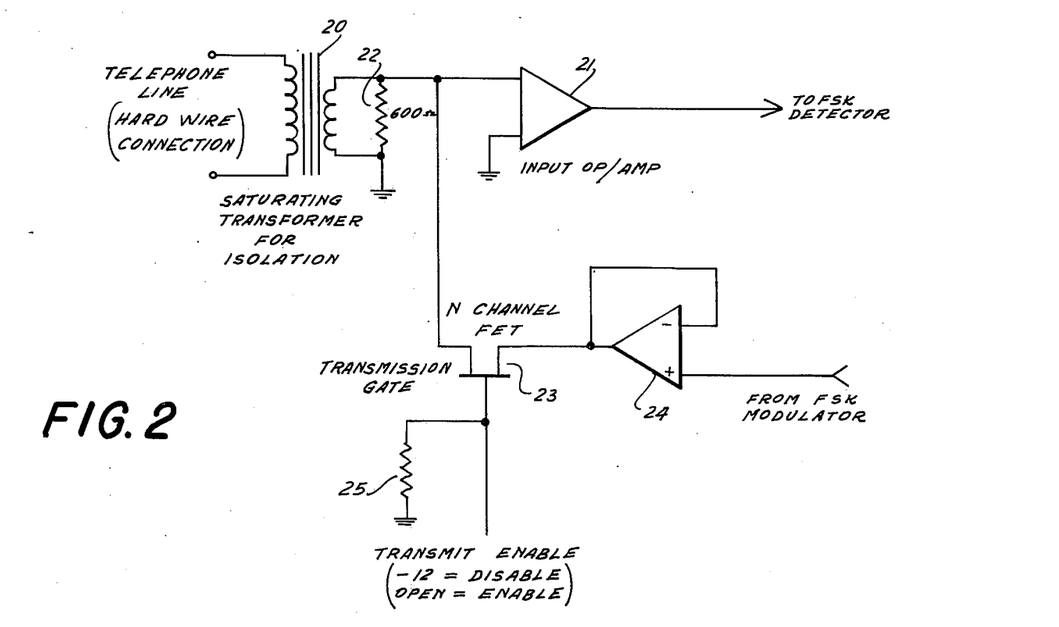
FIG. 2 is a circuit diagram showing the connection between the decoder and the communications network.

Before discussing the arrangement of the storage locations in the random access memory as well as explaining the operation of the decoder billing means and the computer means, reference is made to FIG. 2 which shows the interconnection of the decoder billing logic circuits to the communications network, in this case a telephone line. As shown in FIG. 2, a saturating transformer 20 has a first winding hard wired to the telephone line and a second winding connected to one input of an operational amplifier 21 whose output goes to a frequency shift keying detector (52a, FIG. 4b). The second input of operational amplifier 21 is grounded. A 600 ohm resistor 22 is connected in parallel with the second winding of transformer 20. One end of the so-formed parallel connection is connected to ground potential. The side of the parallel connection which is connected to an input of operational amplifier 21 is also connected to the source-drain circuit of a field effect transistor 23. The other side of the source-drain circuit is connected to the output of an operational amplifier 24 whose non-inverting input receives signals from the frequency shift keying modulator. The gate of transistor 23 is connected through a resistor 25 to ground potential and is further adapted to receive the transmit-enable signal (also called the initiation signal herein). In operation, the saturating transformer isolates the system from the telephone line and also limits and clips the ringing signal. The normal open circuit voltage on a telephone line is about 48 volts DC which has superimposed on it a 120 volt RMS AC signal to ring the telephone bell. To protect the circuit from the high AC voltage, the transformer coil saturates above a predetermined level. The gate of field effect transistor 23 is normally kept at its blocking voltage (−12 volts); this blocking voltage is removed when it is desired to transmit signals from the FSK modulator to the telephone line. It should be noted that frequency shift modulators and detectors are commercially available. The former comprise voltage controlled oscillators yielding a first frequency upon application of a logic "1" (high voltage) and a second frequency upon application of a logic "0" (low voltage). The detectors comprise the inverse circuits, yielding an output "1" and "0" in response to the first and second frequency, respectively. Neither the first nor the second frequency lies within the normal voice transmission band.

Figure 3:
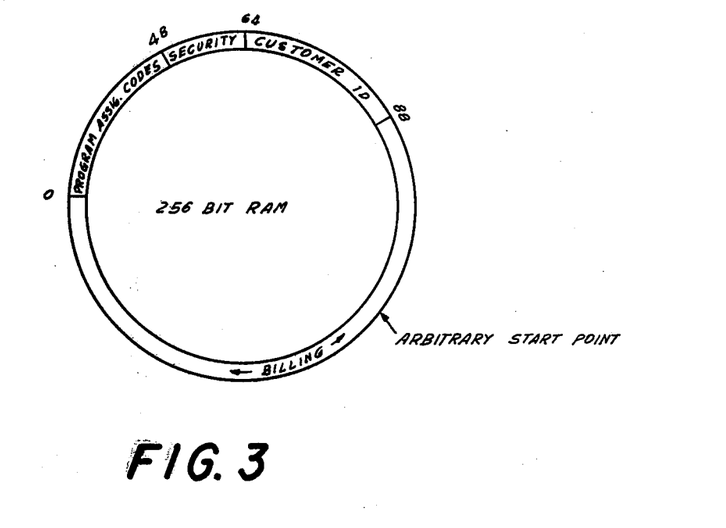
FIG. 3 is a diagram showing the storage location arrangement in the random access memory.

The arrangement of storage locations in random access memory 10 is shown in FIG. 3. Storage locations 0 − 48 store program code numbers. As explained in the referenced application, these program code numbers, when read out under control of the program identification number, set up the decoder logic to a particular mode in correspondence with the then-present encoder code. Storage locations 48 − 64 hold a customer security number which is never read out from the random access memory. The customer identification number is stored in storage location 64 − 88, while the program identification numbers utilized for billing purposes are stored in locations 88 − 255. It should be noted that each storage location stores one bit. The program assignment codes each comprise 16 bits, i.e. four binary coded decimal digits. The number of possible program assignment codes is the number of ways 16 sequential bits can be read from a 48 bit string. For example, the program assignment code could be bit 0 − 15, bit 1 − 16, bit 2 − 17, etc. 32 Different 16-bit strings (bytes) can thus be derived from the program code numbers stored in location 0 − 48. The program identification numbers located in the billing section are hexadecimal numbers, each of the digits of the two-digit numbers being represented by four bits. 21 Such eight-bit two-digit numbers can thus be stored in the available billing space. The arbitrary start point illustrated in FIG. 3 is a start point hard wired into the address counter which will be discussed later. The security number is a four-digit binary coded decimal number, each of the four digits including four bits. The customer identification number utilized in addressing the central computing means, in this preferred embodiment, is a 24-bit number. It should again be noted that the program code numers must be updated periodically to correspond to the codes at the transmitting ends. Further, in the system of the present invention, this updating from the computer is not to take place until the program identification numbers required for billing purposes have been transmitted to the computer.

System Sequence (a) Decoder to computer (Decoder reads out data from shift register starting from 0 to 255).
  (1) Initiate (long tone)
  (2) 64 bits 0 and 1 sequence (line test)
  (3) 24 bits customer ID
  (4) 168 bits billing data (program identification numbers)
(b) Computer to decoder (in reverse order).
  (1) Initiate (long tone). At end of long tone decoder switches to arbitrary start point and addresses memory backwards.
  (2) X bits inverse position of billing data just sent out + customer ID in reverse (decoder compares to stored data).
  (3) 16 bits security number (decoder still reading and comparing).
If data checks throughout, it now switches memory into WRITE mode).
  (4) 48 bits of new program codes (decoder writes this in).

(5) Y bits of confusion signals (decoder stays in write mode but ignores confusion signals and writes "0"'s into billing area.)

(X + Y = 192. The decoder, starting from the hard wired arbitrary point in its memory, has gone through the whole memory once backwards and ended up at the arbitrary point again. It has erased all the billing data from 255 backwards to the start point, leaving the billing data from the arbitrary point to bit 88 still intact. The decoder remains in the write mode, but the memory counter stops counting).

Decoder to computer (in reverse order. This cycle occurs automatically, after computer transmission ends).

(1) Initiate (long tone)

(2) V bits of confusion signals (decoder is in memory write mode and writes 0's in the memory running backwards from arbitrary start point, while transmitting confusion signals. It thus writes 0's into all the billing cells from the arbitrary start point to 88. Decoder rides through security number and customer ID areas of memory without doing anything to memory.)

(3) 48 bits of program codes complement (these codes are read out from memory and compared to previously transmitted data at computer).

(4) W bits of confusion signals. (v + w = 208).

Figure 4A:
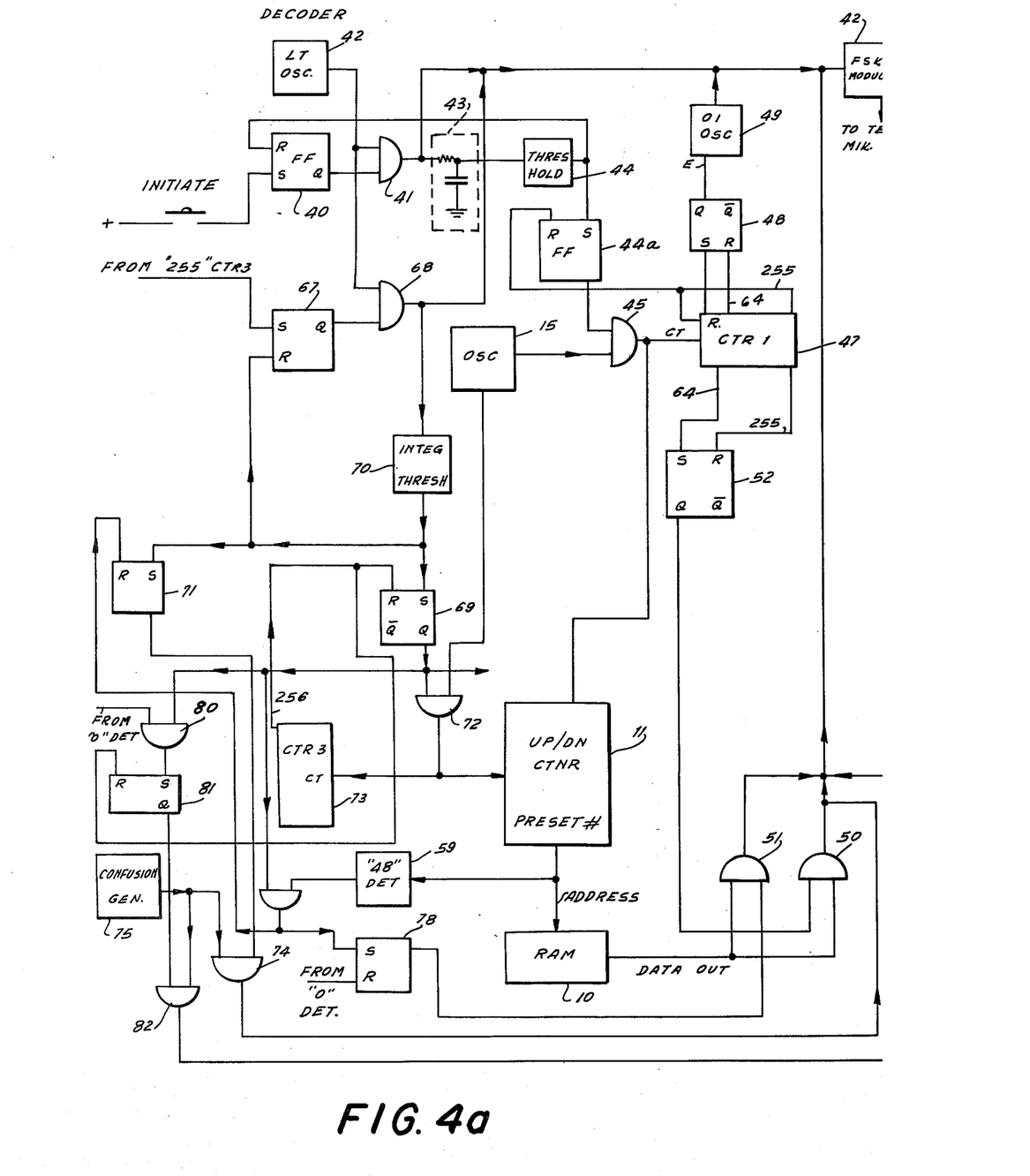
FIGS. 4a and 4b together constitute the decoder billing logic circuitry.
Figure 4B:
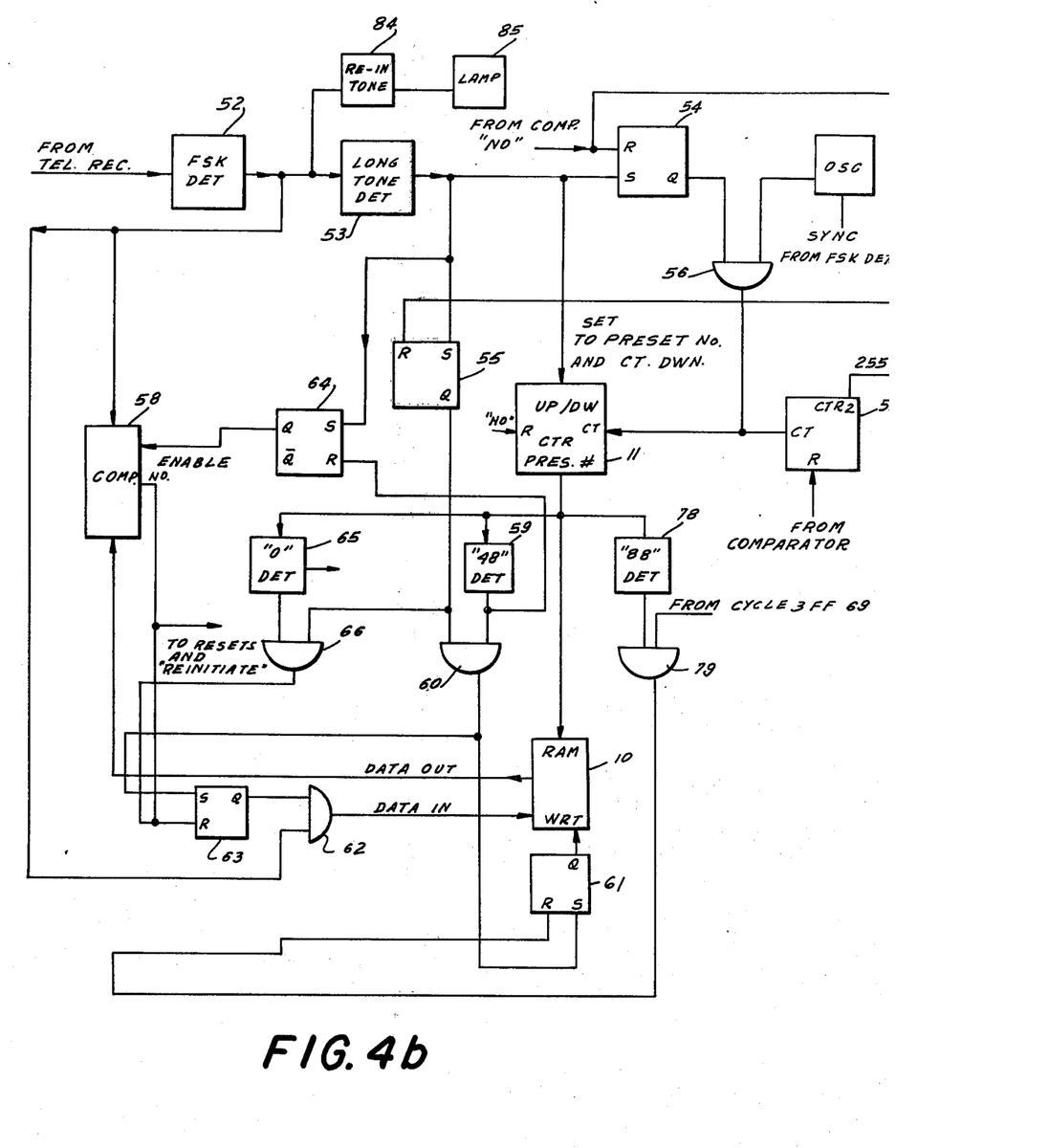

The circuits at the decoder for implementing the decoder portion of the above-described system sequence are shown in block diagram form in FIGS. 4a and 4b. It should be noted that the operation of all counters, flip-flops, etc. in this diagram is synchronized by clock oscillator 15. The count inputs, the set and reset inputs of the flip-flops, etc., are all strobed, that is the signal at the respective inputs is either a "1" or a "0" at the time of the strobe pulse. The strobe signal occurs in the center of a pulse furnished by clock oscillator 15 so that no ambiguity can exist. Further, in a preferred embodiment, strobe pulses are added after four consecutive data bits, so that if four consecutive bits are all 0-bits, the clock at the computer and the decoder cannot drift away from each other for a time exceeding the time required to transmit four bits. The actual circuitry for this preferred embodiment will therefore contain strobe pulse removing circuits which remove every fifth and sixths pulse from the incoming string of pulses. However, since these techniques are standard, and the showing of all synchronizing signals would only unduly complicate the diagrams, these have been omitted.

Referring now to FIGS. 4a and 4b, the subscriber pushes the button or switch marked "initiate", thereby setting in motion the system sequence previously described. Pushing of the "initiate" button causes the opening of a switch in the gate circuit of field effect transistor 23 of FIG. 2, thereby causing the transmission circuit to be enabled. Further, pushing of the "initiate" button sets a flip-flop 40 whose Q output is applied to one input of an AND gate 41. The second input of AND gate 41 is connected to the output of long tone oscillator 42. While flip-flop 40 is set, a signal therefore appears at the output of AND gate 41. This signal is applied directly to the input of FSK modulator 42, thereby being transmitted through the telephone line to the computer. Further, the output of AND gate 41 is applied through an integrating circuit 43 and a threshold circuit 44 to the set input of a flip-flop 44a. The threshold circuit, in a preferred embodiment, is a Schmitt trigger circuit. The output of the threshold circuit is applied to the reset input of flip-flop 40. The transmission of the long tone to the computer is thus terminated a predetermined period after its beginning, while an AND gate 45 is enabled. The second input of AND gate 45 is connected to the output of clock oscillator 15, while its output is connected to the counting input of up/down counter 11, namely the address counter for the random access memory 10, and to the counting input of counter 47, herein referred to as the first cycle counter. The first count on counter 47 sets a flip-flop 48 whose Q output is connected to the enable input of a 0,1 oscillator 49. The output of oscillator 49 is applied to the input of FSK modulator 42, thereby causing the zero-one sequence required for line test to be transmitted through the telephone line to the computer. Meanwhile, address counter 11 is counting up, causing the random access memory storage locations 0 – 64 to be addressed. However, no data is transmitted out, since AND gates 50 and 51, each of which has a first input connected to the data output of the random access memory 10, are both non-conductive.

When counter 47 reaches the count of "64", a flip-flop 52 is set. The Q output of flip-flop 52 is connected to the second input of AND gate 50, causing this AND gate to become conductive. The data in the storage locations addressed by address counter 11 is therefore transferred through AND gate 50 to the input of FSK modulator 42 and thus through the telephone line to the computer. The customer identification number as well as 168 bits of billing data are transferred, since flip-flop 52 remains conductive until count 255 is reached on counter 47. When counter 47 reaches the count of 255, flip-flop 52 is reset, causing AND gate 50 to be blocked, and, further resetting flip-flop 44a, thereby stopping the transmission of clock pulses from oscillator 46 to counters 47 and 11. The 255 count on counter 47 also resets said counter to zero. The first cycle of the system sequence is thus completed.

The frequency shift keying detector 52a shown in FIG. 4b has an input connected to the output of operational amplifier 21 of FIG. 2. At its output, all signals sent from the computer, including data signals and synchronizing signals, are to be found. The output of the frequency shift detector 52a is connected to the input of a long tone detector 53 which is illustrated in greater detail in FIG. 6. The output of long tone detector 53 is applied to the set input of a flip-flop 54 as well as that of a flip-flop 55. The Q output of flip-flop 54 is connected to one input of an AND gate 56 whose other input is connected to oscillator 15. The output of AND gate 56 is connected to the counting input of address counter 11 and of a counter 57 herein referred to as the second cycle counter. The output of long tone detector 53 is also connected to an input of counter 11 which causes it to be set to the preset number and to count down any pulses applied at the counting input. Since AND gate 56 is conductive, pulses from oscillator 15 will be applied to the counting input of counters 11 and 57. Counter 57, therefore, commences to count in the upwards direction, while counter 11 counts from the preset number in the reverse direction. Storage locations in random access memory 10 are therefore addressed in reverse order from the arbitrary start point. The data read out from random access memory 10 is supplied to one input of comparator 58 whose other comparing input is connected to the output of frequency shift keying detector 52. Comparator 58 thus compares the billing data sent in reverse order from the computer to the data stored in the random access memory, that is data that was sent to the computer in the first cycle of the system sequence. It further compares the customer identification number stored in the random access memory to the customer identification number sent back from the computer. Further, the security number is read out at the decoder and again compared to the security number, sent, in reverse order, by the computer. As long as the comparator furnishes a "yes" output indicative of the fact that the signals at the two comparing inputs are the same, the read out and comparison continue undisturbed until a "48" detect signal is generated at the output of "48" detector 59. The various number detect circuits indicated in block diagram form comprise a plurality of logic circuit which are strobed at a time at which the count on the counter is set and not in the process of being changed.

The Q output of flip-flop 55 as well as the output of "48" detect circuit 59 are applied to the two inputs of an AND gate 60. AND gate 60 thus furnishes an output upon detection of the number "48" during the second cycle, as indicated by the presence of a signal on the Q output of flip-flop 55. The output of AND gate 60 is connected to the set input of a flip-flop 61 whose Q output furnishes a write enable signal to random access memory 10. Random access memory 10 will thus start to record any data applied to its input.

The incoming data is supplied to random access memory 10 by the output of an AND gate 62. AND gate 62 has a first input connected to the output of FSK detector 52 and a second input connected to the Q output of a flip-flop 63. The set input of flip-flop 63 is connected to the output of AND gate 60. Data is thus gated to the input of random access memory 10 after address 48 has been passed, but only if comparator 58 indicated that all data read out from random access memory 10 from the arbitrary start point to storage location 48 has agreed with the corresponding data transmitted back from the computer. In the event that there was no equality between the two inputs prior to this point, comparator 58 furnished a "no" signal. This signal is applied to the reset inputs of flip-flops 54, 55, 61, and 63 as well as to the "set to zero" inputs of counters 11 and 57. It is further utilized to light a lamp in the decoder, causing the subscriber to re-initiate the whole system sequence. Of course, the subscriber would re-initiate within a short time in any case, since the "no" signal from comparator 58 prevents the writing of new program codes into the random access memory and since, therefore, the proper program codes for setting up the decoder logic will soon not be in the random access memory. This will of course prevent the subscriber from getting a usable picture.

As said above, the data (new program codes) will be recorded starting with storage address 48 if all comparisons up to that point have checked out. At address point 48, the comparator is disabled. The comparator was previously enabled by a signal from the Q output of a flip-flop 64 which was set by the output of long tone detector 53, that is at the beginning of the second cycle of the system sequence. The output of the "48" detect circuit 59 causes flip-flop 64 to reset, thereby disabling comparator 58.

The recording of data in the memory proceeds until a signal is furnished from "0" detect circuit 65. The output of this detector is applied to one input of an AND gate 66 whose other input is connected to the Q output of flip-flop 55. AND gate 66 therefore yields an output signal when a zero address is detected in the second cycle. This signal causes a resetting of flip-flop 63, thereby causing the output of AND gate 62 to be a "0" output. Data received from the computer will therefore be blocked from random access memory 10. At this point, it must be remembered the computer is sending confusion signals. Since the output of AND gate 62 is a "0", the data recorded in the random access memory starting with address zero will be logic zeros, that is, the data in the memory will be erased. The erasure continues until counter 57 reaches the 255 count. At this point, flip-flop 54 will be reset by the output of counter 57, as will flip-flop 55. No further signals will be applied from oscillator 46 to either counter 11 or counter 57 and the Q output of flip-flop 55 will go to zero. Flip-flop 61 will remain in the set condition, causing random access memory 10 to be in the recording mode. This completes the second cycle in the system sequence.

The signal signifying the count of 255 on counter 57 is also utilized automatically to initiate the third cycle in the system sequence. Referring again to FIG. 4a, the signal signifying the count 255 from counter 57 is applied to the set input of a flip-flop 67 whose Q output is connected to one input of an AND gate 68. The other input of AND gate 68 is connected to the output of long tone oscillator 42. The output of AND gate 68 is directly applied to the input of the frequency shift keying modulator 42 and is applied to the set input of a flip-flop 69 through an integrating and threshold circuit 70. In a preferred embodiment of the present invention, circuit 70 is identical to the combination of circuits 43 and 44. The output of circuit 70 is applied to the reset input of flip-flop 67, causing the transmission of the long tone from the decoder to te computer to be interrupted. The output signal from circuit 70 is also applied to the set input of a flip-flop 71.

The setting of flip-flop 69 causes an AND gate 72 which has an input connected to the Q output of flip-flop 69 to be enabled. The second input of AND gate 72 is the output of oscillator 15. The output of AND gate 72 is connected to the counting input of the third cycle counter, namely counter 73. Counter 11 which was reset to zero at the end of the second cycle therefore starts counting upwards, addressing random access memory 10. Counter 73 also counts upwards. Since flip-flop 61 (FIG. 4b) is still set, the random access memory 10 is still in the writing mode and further zeros are recorded at the billing area.

The setting of flip-flop 71 enables an AND gate 74 whose output is connected to the input of the FSK modulator. The second input of AND gate 74 is connected to the output of confusion signal generator 75. Therefore, while flip-flop 71 is in the set state, signals from confusion generator 75 are transmitted through the telephone line to the computer. This transmission of signals from confusion signal generator 75 continues until "48" detect circuit 59 furnishes a signal to one input of an AND gate 77. The other input of AND gate 77 is connected to the Q output of flip-flop 69. When the count of 48 is reached in the address counter during the third cycle, AND gate 77 will furnish a signal resetting flip-flop 71 and thereby stopping the signals from the confusion signal generator. It should be noted that the confusion signal generator can be any type of noise signal generator, such as, for example, the noise signal generator shown in U.S. Pat. No. 3,824,322 (Horowitz).

Some predetermeined signal pattern can also be used. The actual signal used makes no difference since neither the computer nor te decoder in any way respond to the confusion signals.

While, as stated above, the sending of confusion signals continues until the count of 48 is detected in the address counter, the writing of zeros, that is, the erasure of data, must of course stop when the count of 88 is reached. Referring to FIG. 4b, the output of an "88" detect circuit 78 is applied to one input of an AND gate 79 whose other input is the Q output of the cycle 3 flip-flop, namely a flip-flop 69. The output of AND gate 79 is applied to the reset input of flip-flop 61, thereby switching the random access memory back into the read mode. The decoder thus rides through memory locations 88–48 without either recording or read-out.

The 48 bits of the program codes recorded in the memory in the second cycle are now to be read out again and transmitted to the computer for comparison there. For this purpose, the output of "48" detector circuit 59 is applied to one input of an AND gate 77 whose second input is enabled by the Q output of flip-flop 69. (It should be noted here that "48" detect circuit 59's other output, namely the output to AND gate 60, is ineffective since there is no Q output from flip-flop 55).

The output of AND gate 77 is applied to the reset input of flip-flop 71, thereby interrupting the transmission from the output of confusion signal generator 75 to the computer. Further, the output of AND gate 77 is supplied to the set input of a flip-flop 78.

The Q output of flip-flop 78 enables the second input of AND gate 51, whose first input receives data from random access memory 10. Data from random access memory 10 is therefore read out through AND gate 51 and modulator 42 until such time as flip-flop 58 is reset. This happens in response to a signal from "0" detector circuit 65. Upon receipt of this signal, the read out of the program codes from the random access memory and their transmission through the telephone network to the computer is stopped.

It is now required that confusion signals be sent from the decoder to the computer until the arbitrary start point has again been reached. For this purpose, the signal from the "0" detector circuit 65 is applied to one input of an AND gate 80 (FIG. 4a). The second input of AND gate 80 is connected to the Q output of flip-flop 69. The signal at the output of AND gate 80 is applied to the set input of a flip-flop 81 whose Q output is connected to the first input of an AND gate 82. The second input of AND gate 82 is also connected to the output of confusion signal generator 75. Signals from confusion signal generator 75 will thus be transmitted to the output of AND gate 82 following the "0" detector circuit output in the third cycle. The output of AND gate 82 is also connected to the input of modulator 42. Confusion signals will therefore again be transmitted from the decoder to the computer until flip-flop 81 is reset. The resetting of flip-flop 81 takes place in response to a count of 255 on counter 73. Thus the transmission of confusion signals is interrupted at the end of the third cycle. The count of 255 on counter 73 also resets flip-flop 69, thereby interrupting the transmission of pulses from oscillator 46 to counters 11 and 73. The count of 255 on counter 73 is also utilized to reset counters 73 and 11 to zero, thereby returning the equipment to its starting condition. This completes the description of the decoder billing logic circuit operation during the complete system sequence.

The operation of the central computing equipment during the system sequence will now be described. It should be noted that it will be described with reference to a logic circuit diagrmm showing the implementation of a special purpose computer. However, the central computing means could equally well be embodied in a large general purpose computer which is also utilized for different purposes and would require only a specific program for implementing the steps required for controlling this general purpose computer to effect the necessary functions.

Figure 5A:
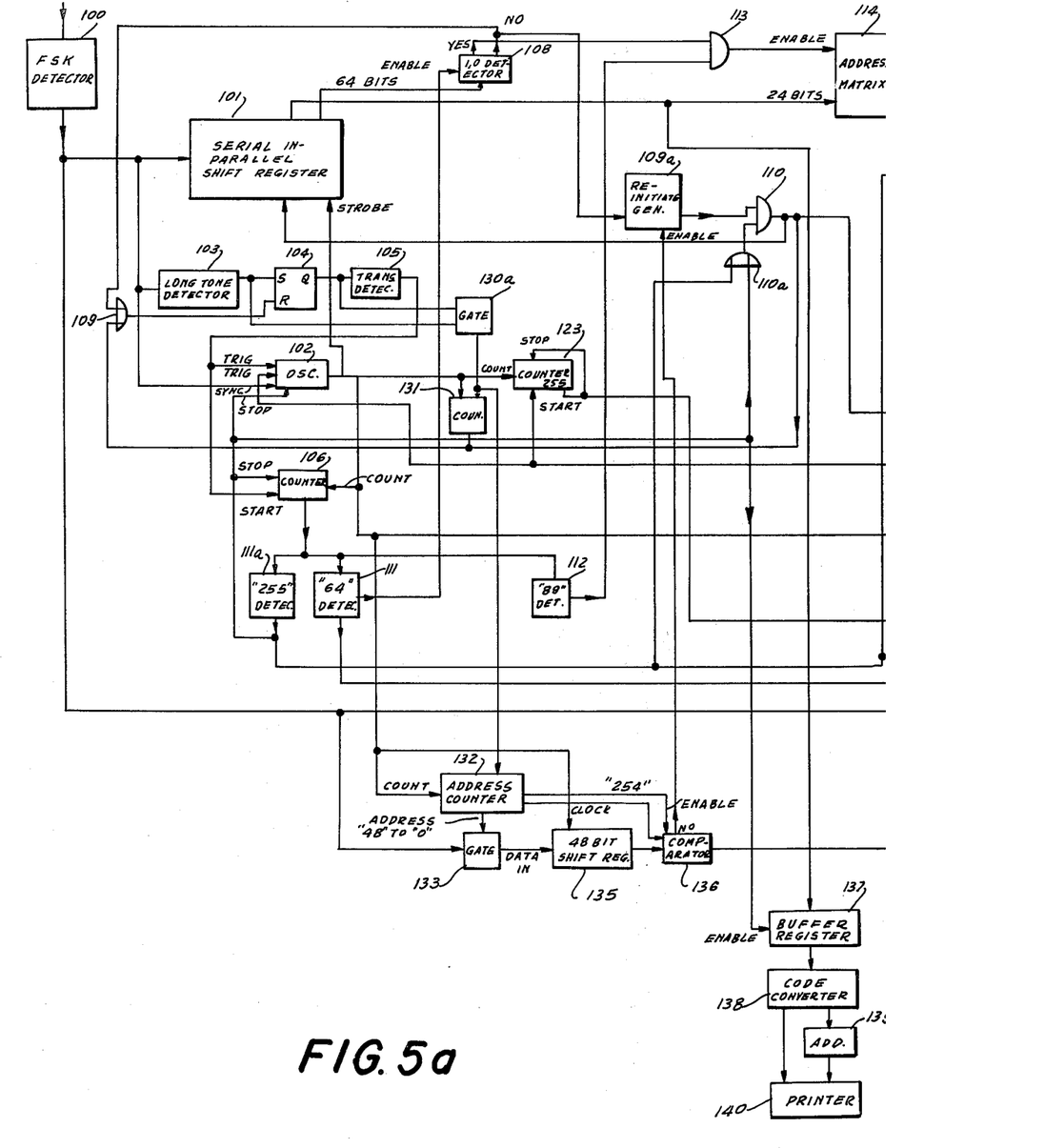
FIGS. 5a and 5b are a block diagram of the central computing circuitry.
Figure 5B:
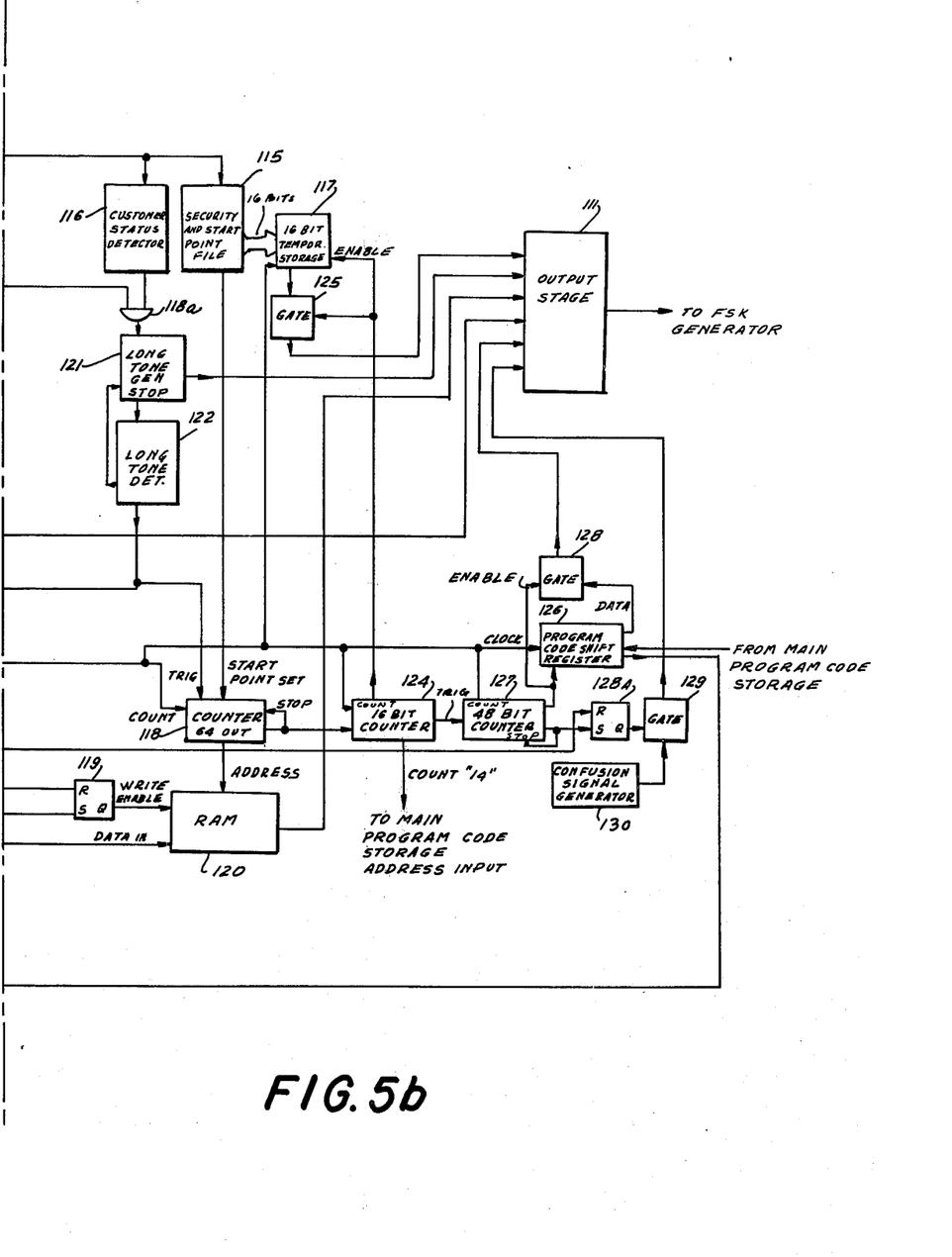

The above-mentioned special purpose computer is shown in FIG. 5. The incoming data is put through a FSK detector 100 whose output is connected to the input of a 255 bit serial in, parallel out shift register 101. It will be noted that no data is entered into shift register 101 until such time as its strobe input receives pulses from oscillator 102. Oscillator 102 has a synchronizing input which responds to pulses at the output of FSK detector 100. Prior to being applied to the strobe input of register 101, the output pulses of oscillator 102, which are slightly delayed in time from the output pulses of FSK detector 100, are differentiated and only that portion resulting from the leading edge is used to strobe shift register 101 as well as the other counters and flip-flops in FIG. 5. However, no pulses appear at the output of oscillator 102 until a trigger signal is applied to its trigger input. The trigger signal is supplied from a long tone detector 103. The output of long tone detector 103 sets a flip-flop 104. The output of flip-flop 104 is applied to a transition detector 105 which detects transitions from the Q to the Q state only. The output of transition detector 105 is applied to the trigger input of oscillator 102 and is also applied to the start input of a counter 106. The counting input of counter 106 receives pulses from the output of oscillator 102. Thus, upon receipt of a long tone transmitted from the decoder, oscillator 102 starts to furnish pulses, and the data transmitted by the decoder, namely first the 64 bits of 0 and 1 sequence, next the 24 bits of customer identification number, and finally the 168 bits of billing data are read into shift register 101 under control of the strobe pulses from oscillator 102.

A "64" detector circuit 107 enables a 1, 0 detector circuit 108 when counter 106 reaches the 64 count. In a preferred embodiment, the 1, 0 detector comprises a comparator having 64 first inputs, connected to stages 1–64 of register 101, and 64 second inputs, alternately having a "0" and "1" input, corresponding to the transmitted "0" and "1" sequence. At this point, it should be noted that detector 108 has an enable input which responds to the output of "64" detector 107. Upon receiving the enable signal, the 1, 0 detector carries out the comparison, and, if the 1, 0 sequence is not as desired, a signal is furnished at a "no" output. This signal is applied to the reset input of flip-flop 104 through an OR gate 109. It is further utilized to enable a re-initiate tone generator 109a whose output is applied to the first input of an AND gate 110. The second input of AND gate 110 receives the signal from "255" detector 111a. The re-initiate tone is therefore applied to the output stage 111a once the count on counter 106 has been completed, that is, when the transmission from the decoder to the computer has stopped. The output of the output stage is then applied through a FSK modulator to the telephone line. The decoder thus receives the information that the line check was inadequate (see re-initiate tone detector 84, lamp energizing circuit 88, and lamp 89, FIG. 4b).

The output of "255" detector 111a is also applied to stop the oscillator 102. The output of AND gate 110 is utilized to reset shift register 101 and is applied through OR gate 109 to the reset input of flip-flop 104. Thus, at the end of the first cycle, all data received from the decoder is stored in shift register 101 if the line check was adequate. If the line check was inadequate, the shift register has been cleared and flip-flop 104 has been reset.

However, before the end of the cycle, "89" detector 112 has furnished an output signal to one input of an AND gate 113. The second input of AND gate 113 is connected to the "yes" output of detector 108. A signal of course appears on this "yes" output when the detector determined that the line check was correct. Therefore, if the line check was correct, the "89" detector circuit 112 causes a signal to appear at the output of AND gate 113. This is an enable signal for address matrix 114, to whose other input are applied the 24 bits of customer identification number. The output of address matrix 114 is applied to security number and start point file 115 as well as to a customer status detector 116. The next subsequent clock pulse causes the security number to be transferred as a 16-bit parallel number into a temporary storage 117. Temporary storage 117 is a register from which the 16 bit number is read out with the leftmost position, that is, the most significant bit, first. Further a number is derived from file 115 which causes a setting of a counter 118 to a position corresponding to the hard wired start point in the address counter at the decoder. The output of customer status detector 116 is applied to one input of an AND gate 118a whose second input receives the output signal from the "255" detector. A signal thus appears at the output of AND gate 118 at the end of the first cycle of the system sequence and only if the customer status is approved, that is, for example if the bills are not too far in arrears.

It should further be noted that the output of "64" detector 107 is applied to the set input of a flip-flop 119 whose reset input is connected to the "255" detector 111a. The Q output of flip-flop 119 is connected to the write enable input of a random access memory 120. The address input of random access memory 120 is connected to the output of counter 106 while its data input is connected to the output of detector 100. Starting with count 64 on counter 106, the data, namely the customer identification number followed by the billing data, is recorded into random access memory 120, while also continuing to be entered into shift register 101. It should be noted that random accesss memory 120 has addresses from 64 to 255 only. At the end of the first cycle, the customer identification number and the billing data are therefore stored in random access memory 120.

Initiation of the second cycle takes place automatically as follows: The output of AND gate 118a is applied to enable long tone generator 121, whose output is applied to long tone detector 121 which is similar to the detectors at the decoder but has a somewhat shorter time constant. The output of long tone detector 122 is applied to the stop input of long tone generator 121. It is further applied to the trigger input of oscillator 102 which again commences to oscillate. Counter 106 was reset to zero by the output of "255" detector 111a at the end of cycle 1. It does not start to count since no start signal is applied to its input. However, the trigger signal from the output of the long tone detector is also applied to the start input of a counter 123 (computer second cycle counter) and of a counter 118 which counts the pulses from oscillator 102 and which has previously been preset to the count representing the arbitrary start point at the decoder. Counter 123 counts upward from zero to count 255. The output of counter 118 is used to address random access memory 120. Counter 118 counts in reverse from the arbitrary start point up to count 64. This causes the data output of the random access memory to be the program identification numbers starting with the arbitrary start point to the end of the billing data, followed by the customer identification number in reverse. The data output of random access memory 120 is applied to the output stage 111 and is therefore transmitted back to the decoder.

When counter 118 reaches the count of 64, it generates a trigger signal which triggers a counter 124 which counts 16 clock pulses, and in a preferred embodiment, is a 16 bit shift register. The pulse triggering counter 124 also stops counter 118. As long as counter 124 is counting, a gate 125 is enabled, and the security number stored in shift register 117 is read out in reverse order under the control of clock pulses from oscillator 102. The output of gate 125 is connected to the input of output stage 111 and the security number is thus transmitted back to the decoder.

One preselected count on counter 124, namely, for example, count 14, is used as an address to transfer new program assignment codes from a program code storage (not shown) to a program code shift register 126. New program assignment codes are thus stored in the shift register. When counter 124 overflows, it triggers a 48-counter 127 which also counts clock pulses from oscillator 102. While counter 127 is counting, a gate 128 is enabled and permits the data in program code shift register 126 to be transmitted through it in series and applied to output stage 111. When counter 127 stops counting, all the new program assignment codes have been transmitted to the decoder, and gate 128 is blocked.

The overflow count on counter 127 also stops the count on said counter and resets it to zero. This overflow also sets a flip-flop 128a. When flip-flop 128a is set, it enables a gate 129 whose second input is connected to the output of the confusion signal generator 130. While flip-flop 128a is set, confusion signals are therefore applied to the input of output stage 111 and therefore transmitted back to the decoder. It must further be remembered that during all of this operation counter 123 has continued to count pulses from oscillator 102. When counter 123 reaches the count of 255, a signal is supplied to the reset input of flip-flop 128a causing the transmission of confusion signals back to the decoder to be stopped. The second cycle in the system sequence is now completed. Before discussing the beginning of the third cycle which is, of course, automatically initiated by the decoder, it should be noted that the Q output of flip-flop 104 is connected to the enable input of a gate 130a. The second input of gate 130a is connected to the output of long tone detector 103. When the first output occurs from long tone detector 103, gate 130a is blocked. It should further be noted that the oscillations of oscillator 102 have not been stopped throughout the second cycle and that this oscillator operates continuously throughout the remainder of the system sequence. Finally, the stop signal applied to counter 106 at the end of the first cycle overrides any start signal. Counter 106 will not start again unless a reset signal is first applied.

At the start of the third cycle, a long tone is again received. This long tone is applied to the set input of flip-flop 104 but is ineffective there since this flip-flop is already set. However, it is also applied through gate 130a to the enable input of a counter 131 whose counting input is connected to oscillator 102. Counter 131 thus starts to count. The output of gate 130 is further applied to an input of an address counter 132 which causes said address counter to be set to the arbitrary start point and to count down. The counting input of counter 132 of course receives pulses from oscillator 102. During the time that the numbers on address counter 132 range from "48" to "0", a gate 133 is enabled. During the time gate 133 is enabled, the data from the output of FSK detector 100 is applied to the data input of a 48 bit shift register 135. The 48 bit shift register 135 is also clocked by pulses from oscillator 102. The program codes now being transmitted from the decoder, that is, the program codes which were transmitted from the computer to the decoder in the previous cycle, are therefore shifted into shift register 135.

Keeping in mind that address counter 132 counts downwards, any selected count prior to the arbitrary start point and following count "0" is utilized to enable a comparator 136. In the embodiment shown in FIG. 5, the count of "254" is utilized. Comparator 136 has a first set of inputs which receive the signals, in parallel, from 48-bit shift register 135. The second set of inputs of comparator 136 are connected to the outputs of program code shift register 126. If the comparator discovers a mismatch in any one bit of the 48 bits applied to its inputs, a "no" signal is applied to the enable input of re-initiate tone generator 110a. No output occurs from this reinitiate tone generator until count 255 is reached on counter 131, that is, until the completion of the third cycle in the system sequence. At that time a signal is applied to AND gate 110 through OR gate 110a and a reinitiate tone is applied to the output stage and therefore transmitted to the decoder. In the absence of any mismatch, the count-down on counter 132 continues, as does the counting upwards on counter 131. When counter 131 reaches the "255" count, a signal is applied to an OR gate 109 whose output resets flip-flop 104. Further, a signal is applied to the stop input of oscillator 102. Shift register 135 is reset to zero, as is counter 132. Except for shift register 101, all parts of the computer system are in the same condition as they were in the beginning of the system sequence.

However, shift register 101 still contains the program identification numbers for billing purposes as well as the customer identification number. Count "255" on counter 131 also triggers a transfer enable which causes the customer identification number and the billing data, located in shift register positions 64–255, to be transferred to a buffer register 137. The output of buffer register 137 is connected to the input of a code converter 138. In code converter 138, the billing numbers (program identification numbers) are converted from the hexadecimal to a binary-coded decimal form. The billing data is then applied in parallel to an adder 139 whose output is connected to a printer 140. The customer identification number is also applied to printer 140 and the sum coming from adder 139, which represents the total charge to the customer, as well as the customer identification number are then printed out. Of course, instead of printer 140 various other devices could be used. For example, the total might be stored in a further memory of the computer until the end of the billing. This latter embodiment is particularly suitable to accomodate subscribers who may view more than 21 programs during any one billing period and who therefore would have two or more partial charges at the end of the billing period.

Shift register 101 is reset after the numbers have been entered into buffer register 137. The complete system sequence is then finished.

Figure 6:
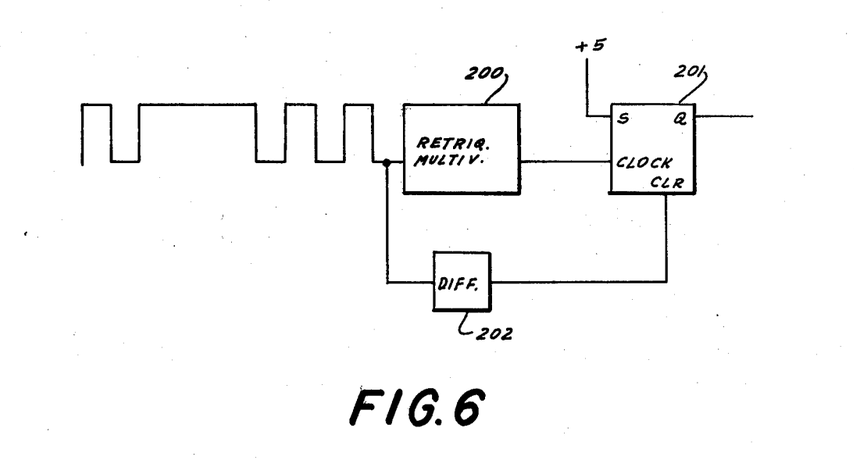
FIG. 6 is a circuit diagram of a long tone detector.

A preferred embodiment of the long tone detector is shown in FIG. 6. The long tone detector comprises a retriggerable one shot multivibrator 200 which is switched to the unstable state by positive-going pulse edges. As long as it receives such positive going pulse edges at time intervals less than its time constant, it will remain in the unstable state, that is, the state furnishing a high output signal. During the long tone, however, such positive going pulse edges will be absent for a time exceeding the time constant of retriggerable multivibrator 200. Therefore, the multivibrator will switch back to the stable state. The negative going edge of its output pulse is applied to the clock input of flip-flop 201 and causes a positive voltage to appear at its Q output. Further, the clear input of flip-flop 201 receives the output of a differentiating circuit 202 which responds to negative-going pulse edges. The end of the long tone will therefore cause the flip-flop to clear. The output of the long tone detector, namely the Q output of flip-flop 201, is thus a positive signal which lasts from the time that the one shot multivibrator 200 returns to its stable state until the end of the long tone.

Some of the security aspects are prevention of billing data erasure except on computer command, prevention of the writing in of enable codes except on command of computer (to prevent illegally obtained codes from being written into memory), preventing memory erase by the use of a tape recorder, which has recorded the previous month's valid telephone transmission from the computer (which contains the correct security number) and which is then used to erase memory just prior to accessing computer the following month.

The enable codes can only be read out if the decoder is addressed by the computer.

During the computer to decoder cycle, the computer first sends out a portion of the billing data from bit 88 to the arbitrary start point (in reverse order). This data is different every month because it depends on the programs watched by the customer. While this data is being received, the decoder compares it with the contents of its own memory. The two data streams must correspond exactly. The computer then sends the customer identification number backwards. Again an exact correspondence is necessary. The computer next sends the security number backwards, again requiring an exact correspondence. If all these correspond exactly, then on count 48 the decoder switches to the write mode and is capable of accepting the new enable codes. The billing erase cycle follows automatically afterwards without any further action from the computer.

In order to erase billing and/or store new enable codes (in addition, of course, to knowing the enable codes), it is necessary to feed the decoder with the security number, know where the arbitrary start point is, and feed it with inverse billing and customer identification number.

What is claimed as new and desired to be protected by Letters Patent is set forth in the appended claims.

1. In a television system furnishing television programs to subscribers having access to a communications network and having encoding-transmitting means for furnishing and transmitting encoded television signals and a plurality of receiving-decoding means, each for receiving said encoded television signals and furnishing corresponding decoded television signals only when activated by a subscriber-furnished program acceptance signal: a billing system, comprising, in combination, storage means in each of said receiving-decoding means, for storing a customer identification number and a plurality of program identification numbers, each indicative of the charge for a subscriber-accepted television program; central computing means connected to said communications network for computing the charge to each of said subscribers for so-accepted programs in response to billing signals applied thereto; a plurality of read-out means, each intercoupled between one of said storage means and said communications network and responsive to an initiation signal, for reading out said customer identification number and said program identification numbers, furnishing corresponding respective customer identification signals and billing signals, and applying said signals to said communications network for transmission to said central computing means; and means for furnishing said initiation signal under subscriber control; wherein said means for furnishing said initiation signal comprises means for furnishing said initiation signal under subscriber control; wherein said encoding-transmitting means comprises means for encoding television signals for each of said television programs in accordance with a selected one of a set of predetermined codes, and means for periodically changing said set of predetermined codes; wherein said receiving-decoding means comprises decoder logic circuit means operable in a selected one of a plurality of decoder modes corresponding in number to said set of predetermined codes in accordance with program code signals applied thereto; wherein said storage means comprises a random access memory having a first set of storage locations for storing said program identification numbers, a second set of storage locations for storing said customer identification number, and a third set of storage locations for storing program code numbers corresponding to said program code signals; and wherein said central computing means comprises means for furnishing updated ones of said program code signals corresponding to a changed set of said predetermined codes to said random access memory only following receipt of said billing signals by said central computing means.

2. A system as set forth in claim 1, wherein said read-out means comprises addressing means for addressing said random access memory selectively in a first order, or in a second order opposite to said first order.

3. A system as set forth in claim 2, wherein said addressing means comprises counting means having a counting input and an arbitrary start number, for counting signals applied at said counting input in a first predetermined direction starting at said arbitrary start number in response to an arbitrary start signal, and in a second predetermined direction opposite to said first predetermined direction in the absence of said arbitrary start signal.

4. A system as set forth in claim 3, wherein said communications network is a telephone network; wherein said random access memory has a data output terminal; wherein said read-out means further comprises output tone generator means, output logic circuit means interconnected between said output tone generator means and said data output terminal for controlling transmission of signals from said data output terminal to said output tone generator means, and coupling means for coupling said output tone generator means to said telephone network in response to said initiation signal.

5. A system as set forth in claim 4, wherein said output tone generator means comprises a frequency-shift modulator.

6. A system as set forth in claim 4, wherein said means for furnishing initiation signals comprises subscriber activatable means for furnishing a first initiation signal; further comprising oscillator means for furnishing counting signals, and first control circuit means connected to said oscillator means for applying said counting signals to said counting input of said counting means in response to said first initiation signal; and wherein said output logic circuit means comprises means for connecting said data output of said random access memory to said output tone generator means when said counting means is addressing said second and first set of storage locations and for blocking the transmission of signals from said data output terminal to said output tone generator means when said counting means is addressing said third set of storage locations, whereby said customer identification number and said billing signals are transmitted to said central computing means.

7. A system as set forth in claim 6, wherein said counting means addresses said third, second and first storage locations in said random access memory in said order when counting in said second predetermined direction; further comprising line check signal generator means for furnishing a line check signal; and wherein said output logic circuit means comprises means for connecting said line check signal generator means to said output tone generator means while said counting means is addressing said third set of storage locations.

8. A system as set forth in claim 6, wherein said central computer means comprises means for furnishing a second initiation signal following receipt of said billing signals; further comprising detecting means connected to said receiving-decoding means for detecting signals from said central computing means, said detecting means comprising means for detecting said second initiation signal; further comprising means for connecting said detecting means to said counting means in such a manner that said second initiation signal constitutes said arbitrary start signal; wherein said arbitrary start number is a number in said first set of storage locations; further comprising second control circuit means for connecting said oscillator means to said counting means upon receipt of said second initiation signal; wherein said random access memory is selectively in a write mode or a read mode; wherein said central computing means further comprises means for transmitting billing signals starting at said arbitrary start number, said customer identification signals, and said program code signals to said receiving-decoding means following transmission of said second initiation signal; further comprising comparator means in said receiving-decoding means, and interconnected between said detecting means and said data output terminal of said random access memory, for comparing signals read from said random access memory to signals received from said central computing means and furnishing an equal signal only in response to equality therebetween; and write control circuit means interconnected between said comparator means and said random access memory, for switching said random access memory to said write mode while said central computing means is transmitting said program code signals to said receiving-decoding means, only if said comparator means furnishes said equal signal when comparing said billing signals and said customer identification signals.

9. A television system furnishing television programs to subscribers having access to a communications network, comprising, in combination, encoding-transmitting means for furnishing and transmitting encoded television signals from a transmitting station to said subscribers; a plurality of receiving-decoding means, each for receiving said encoded television signal and furnishing corresponding decoder television signals, each comprising decoder logic circuit means operable in one of a plurality of decoder modes selected in accordance with a program code number; storage means for storing a customer identification number, a plurality of program identification numbers, each indicative of the charge for a subscriber-accepted television program, and said program code number; central computing means connected to said communications network for computing the charge to each of said subscribers for so-accepted programs in response to billing signals applied thereto and for furnishing updated program code signals corresponding to an updated program code number required for proper decoding to said receiving-decoding means only following receipt of said billing signals; a plurality of read-out means, each intercoupled between one of said storage means and said communications network and responsive to an initiation signal, for reading-out said customer identification number and said program identification numbers, furnishing corresponding respective customer identification signals and billing signals, and applying said signal to said communications network for transmission to said central computing means; and means for furnishing said initiation signal, whereby correct operation of said receiving-decoding means is impeded if said central computing means fails to receive said billing signals prior to updating of said program code number.

10. A system as set forth in claim 9, wherein said program code number is stored in a storage location having a program code number address; wherein said program identification number constitutes said program code number address; further comprising means operable under control of said program identification number for addressing said program control number address and furnishing program code signals corresponding to said program code number to said decoder logic circuit means, thereby setting up said decoder mode.

11. Apparatus as set forth in claim 10, wherein said encoding-transmitting means comprises means for transmitting said program identification numbers; and wherein said receiving decoding means comprises detecting means for detecting said program identification number and storing said program identification number in said storage means only upon receipt of a subscriber-furnished program acceptance signal.

12. A system as set forth in claim 9, wherein said encoding-transmitting means comprises means for encoding television signals constituting a television program in accordance with a selected one of a set of predetermined codes, and means for periodically changing said set of predetermined codes; wherein said decoder logic circuit means operates in a selected one of a plurality of decoder modes corresponding in number to said set of predetermined codes in accordance wih program code signals applied thereto; and further comprising means for furnishing said program code signals to said decoder logic circuit means under control of said program code numbers stored in said storage means, whereby said program code number must be updated when said set of predetermined codes is changed.

13. In a television system furnishing television programs to subscribers having access to a communications network and having encoding-transmitting means for furnishing nd transmitting encoded television signals and a plurality of receiving-decoding means, each for receiving said encoded television signals and furnishing corresponding decoded television signals only when activated by a subscriber-furnished program acceptance signal: a billing system, comprising, in combination, storage means in each of said receiving-decoding means, for storing a customer identification number and a plurality of program identification numbers, each indicative of the charge for a subscriber-accepted television program; central computing means connected to said communications network for computing the charge to each of said subscribers for so-accepted programs in response to billing signals applied thereto; a plurality of read-out means, each intercoupled between one of said storage means and said communications network and responsive to an initiation signal, for reading out said customer identification number and said program identification numbers, furnishing corresponding respective customer identification signals and billing signals, and applying said signals to said communications network for transmission to said central computing means; and means for furnishing said initiation signal; wherein said storage means comprises a random access memory having a first set of storage locations for storing said program identification numbers, a second set of storage locations for storing said customer identification number, and a further set of storage locations for storing a security number; wherein said encoding-transmitting means comprises means for encoding television signals for each of said television programs in accordance with a selected one of a set of predetermined codes, and means for periodically changing said set of predetermined codes; wherein said receiving-decoding means comprises decoder logic circuit means operable in a selected one of a plurality of decoder modes corresponding in number to said set of predetermined codes; wherein said central computing means has means for furnishing security number signals corresponding to said security number in response to customer identification signals received from said receiving-decoding means; wherein said readout means further comprises means for reading out said security number and furnishing corresponding security number signals; and wherein said receiving-decoding means further comprises comparator means for comparing security number signals received from said central computing means to security number signals read out by said read out means and furnishing an equality signal only upon correspondence therebetween; and wherein said receiving-decoding means further comprises erasing means for erasing said program identification numbers from said first set of storage locations upon receipt of said equal signal, whereby erasure of said program identfication numbers is dependent upon receipt by said receiving-decoding means of said security number signals from said central computing means.

14. In a television system furnishing television programs to subscribers having access to a communications network and having encoding-transmitting means for furnishing and transmitting encoded television signals and a plurality of receiving-decoding means, each for receiving said encoded television signals and funishing corresponding decoded television signals only when activated by a subscriber-furnished program acceptance signal: a billing system, comprising, in combination, storage means in each of said receiving-decoding means, for storing a customer identification number and a plurality of program identification numbers, each indicative of the charge for a subscriber-accepted television program; central computing means connected to said communications network for computing the charge to each of said subscribers for so-accepted programs in response to billing signals applied thereto; a plurality of read-out means, each intercoupled between one of said storage means and said communications network and responsive to an initiation signal, for reading out said customer identification number and said program identification numbers, furnishing corresponding respective customer identification signals and billing signals, and applying said signals to said communications network for transmission to said central computing means; and means for furnishing said initiation signal; wherein said initiation signal is a long tone having a duration in time exceeding the duration in time of the others of said signals applied to said communications network; and wherein said central computing means comprises long tone detector means, said long tone detector means or means comprising a retriggerable multivibrator having a stable and an unstable state, adapted to remain in the unstable state upon receipt of trigger signals having a predetermined minimum repetition rate and to remain in said unstable state for a predetermined time period less than said duration in time of said long tone following receipt of the last of said trigger signals; wherein said signals applied to said communications network have said minimum repetition rate until application of said long tone to said transmission network; further comprising means connected to said retriggerable multivibrator for furnishing a signal extending in time from the switching of said retriggerable multivibrator to said stable state to the end of said long tone, said signal constituting said initiation signal.

* * * * *

UNITED STATES PATENT AND TRADEMARK OFFICE
CERTIFICATE OF CORRECTION

PATENT NO. : 4,115,807
DATED : September 19, 1978
INVENTOR(S) : H. George Pires

It is certified that error appears in the above—identified patent and that said Letters Patent is hereby corrected as shown below:

Insert:   Assignee:   Teleglobe Pay-TV System, Inc.

Rego Park, N. Y.

Insert:   Attorney, Agent or Firm - Marianne Rich

Signed and Sealed this

First Day of April 1980

[SEAL]

Attest:

SIDNEY A. DIAMOND

Attesting Officer    Commissioner of Patents and Trademarks